United States Patent
Kimura et al.

(10) Patent No.: US 10,557,009 B2
(45) Date of Patent: Feb. 11, 2020

(54) THERMALLY EXPANDABLE MICROCAPSULE COMPLEX, METHOD FOR MANUFACTURING SAME, RUBBER COMPOSITION IN WHICH COMPLEX IS BLENDED, AND PNEUMATIC TIRE USING COMPOSITION

(71) Applicant: The Yokohama Rubber Co., LTD., Minato-ku, Tokyo (JP)

(72) Inventors: Kazushi Kimura, Hiratsuka (JP); Hirokazu Kageyama, Hiratsuka (JP); Masaki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/557,791

(22) PCT Filed: Mar. 10, 2016

(86) PCT No.: PCT/JP2016/057583
§ 371 (c)(1),
(2) Date: Sep. 12, 2017

(87) PCT Pub. No.: WO2016/143852
PCT Pub. Date: Sep. 15, 2016

(65) Prior Publication Data
US 2018/0072860 A1 Mar. 15, 2018

(30) Foreign Application Priority Data
Mar. 12, 2015 (JP) .................................. 2015-049253

(51) Int. Cl.
*C08L 1/02* (2006.01)
*C08J 9/32* (2006.01)
(Continued)

(52) U.S. Cl.
CPC ............... *C08J 9/32* (2013.01); *B01J 13/206* (2013.01); *B60C 1/0016* (2013.01);
(Continued)

(58) Field of Classification Search
CPC ............. C08J 9/32; C08J 2203/22; C08L 1/02
See application file for complete search history.

(56) References Cited

U.S. PATENT DOCUMENTS 5,785,817 A * 7/1998 Tan .......................... C08J 9/32
162/218
2017/0183483 A1 6/2017 Kimura et al.

FOREIGN PATENT DOCUMENTS

| JP | H11-035736 | 2/1999 |
| JP | 2008-013621 | 1/2008 |

(Continued)

OTHER PUBLICATIONS

Machine translation of 2011-252116 by Iizuka et al. (Year: 2011).*
International Search Report for International Application No. PCT/JP2016/057583 dated Jun. 14, 2016, 4 pages, Japan.
Hiroaki Otsuka, "Lower-Density, High-Bulk Paper Using Thermally Expansive Microcapsules", vol. 10 No. 3, pp. 23 to 25, Material Stage, Japan.

*Primary Examiner* — Michael M Dollinger
*Assistant Examiner* — Christina H. W. Rosebach
(74) *Attorney, Agent, or Firm* — Thorpe North & Western

(57) ABSTRACT

In the present technology, a thermally expandable microcapsule complex is blended in a rubber component, the thermally expandable microcapsule complex being obtained by preparing an aqueous solution of a water-soluble polymer having a concentration of 1 to 30 mass %, adding from 5 to 60 parts by mass of cellulose fibers to 100 parts by mass of the aqueous solution to prepare a liquid dispersion (1), adding from 10 to 200 parts by mass of thermally expandable microcapsules to the liquid dispersion (1) to prepare a liquid dispersion 2), and evaporating the moisture content of the liquid dispersion (2).

4 Claims, 1 Drawing Sheet

(51) Int. Cl.
  *B01J 13/20*    (2006.01)
  *B60C 1/00*    (2006.01)
  *C08J 9/00*    (2006.01)
  *C08J 9/36*    (2006.01)
  *C08L 7/00*    (2006.01)
  *C08L 9/00*    (2006.01)
(52) U.S. Cl.
  CPC ........... *C08J 9/0061* (2013.01); *C08J 9/0085* (2013.01); *C08J 9/36* (2013.01); *C08L 1/02* (2013.01); *C08L 7/00* (2013.01); *C08L 9/00* (2013.01); *C08J 2301/02* (2013.01); *C08J 2431/04* (2013.01); *C08J 2435/00* (2013.01); *C08L 2203/14* (2013.01); *C08L 2205/16* (2013.01)

(56) References Cited

FOREIGN PATENT DOCUMENTS

| | | | |
|---|---|---|---|
| JP | 2011-012248 | 1/2011 | |
| JP | 2012-122019 | 6/2012 | |
| JP | 2014-152289 | 8/2014 | |
| JP | 2015-010136 | 1/2015 | |
| JP | 2015-221854 | 12/2015 | |
| JP | 2016-074801 | 5/2016 | |
| WO | WO-2013132021 A1 * | 9/2013 | ........... B32B 29/005 |
| WO | WO 2015/178485 | 11/2015 | |

* cited by examiner

THERMALLY EXPANDABLE MICROCAPSULE COMPLEX, METHOD FOR MANUFACTURING SAME, RUBBER COMPOSITION IN WHICH COMPLEX IS BLENDED, AND PNEUMATIC TIRE USING COMPOSITION

TECHNICAL FIELD

The present technology relates to a thermally expandable microcapsule complex, a method for manufacturing the same, a rubber composition in which the complex is blended, and a pneumatic tire using the composition. In particular, the present technology relates to a thermally expandable microcapsule complex whereby on-ice performance can be dramatically improved while wear resistance is maintained, a method for manufacturing the same, a rubber composition in which the complex is blended, and a pneumatic tire using the composition.

BACKGROUND ART

Many means for improving on-ice performance (braking ability on ice) of studless tires have been proposed. For example, known techniques include blending a hard foreign material or hollow particles in the rubber, and forming micro-irregularities on the surface of the rubber, thereby removing the water film produced on the surface of ice to improve frictional force on ice (for example, see Japanese Unexamined Patent Application Publication No. H11-35736). Other methods include reducing the content of reinforcing filler in the rubber composition to increase flexibility, or blending a special compounding agent that forms holes in the rubber and absorbing water on an icy road surface to increase adhesive properties between the rubber and ice, thereby improving friction force.

However, when hollow particles, for example, are blended in rubber, there is a problem that cavities form in the tread rubber and wear resistance decreases.

SUMMARY

The present technology provides a thermally expandable microcapsule complex whereby on-ice performance can be dramatically improved while wear resistance is maintained, a method for manufacturing the same, a rubber composition in which the complex is blended, and a pneumatic tire using the composition.

As a result of diligent research, the inventors discovered that the above problem can be solved by using a complex obtained by adhering a plurality of thermally expandable microcapsules on cellulose fibers, and thus arrived at the present technology.

Specifically, the present technology will be described hereinafter.

1. A thermally expandable microcapsule complex having a structure composed of a plurality of thermally expandable microcapsules adhered on cellulose fibers.

2. The thermally expandable microcapsule complex according to the above 1, wherein the complex has a structure composed of a plurality of the thermally expandable microcapsules connected in a thread-like, band-like, or clustered manner on the cellulose fibers.

3. The thermally expandable microcapsule complex according to the above 1, wherein the cellulose fibers are cellulose microfibrils.

4. The thermally expandable microcapsule complex according to the above 3, wherein the cellulose microfibrils are cellulose microfibril fiber bodies containing nanostructures composed of at least one of cellulose crystals measuring from 10 nm to 100 nm in thickness and approximately from 100 nm to 500 nm in length and cellulose nanofibers measuring from 3 nm to 100 nm in thickness and not less than 5 µm in length. The fiber width of the microfibril fiber body is not less than 0.1 µm, and the length thereof is not less than 0.5 µm.

5. A method for manufacturing the thermally expandable microcapsule complex described in the above 1, the method including:
preparing an aqueous solution of a water-soluble polymer having a concentration of from 1 to 30 mass %;
adding from 5 to 60 parts by mass of cellulose fibers to 100 parts by mass of the aqueous solution to prepare a liquid dispersion (1);
adding from 10 to 200 parts by mass of thermally expandable microcapsules to the liquid dispersion (1) to prepare a liquid dispersion (2); and
evaporating moisture of the liquid dispersion (2).

6. The manufacturing method according to the above 5, wherein from 1 to 10 mass % of a polar solvent is blended in the thermally expandable microcapsules in the step of preparing the liquid dispersion (1) or the liquid dispersion (2).

7. The manufacturing method according to the above 6, wherein the polar solvent is at least one type selected from the group consisting of dimethyl sulfoxide, nitrilotriethanol, propylenecarbonate, γ-butyrolactone, N-methyl-2-pyrrolidone, N,N-dimethylacetamide, dimethylformamide, and acetonitrile.

8. The manufacturing method according to the above 5, wherein a liquid dispersion (1') is used instead of the liquid dispersion (1). The liquid dispersion (1') is obtained by adding from 5 to 40 parts by mass of the aqueous solution of water-soluble polymer and from 5 to 60 parts by mass of cellulose fibers to 100 parts by mass of a non-volatile liquid compound.

9. The manufacturing method according to the above 5, wherein the water-soluble polymer is at least one type selected from polyacrylic acid, polyacrylamide, polyethyleneoxide, polyvinylalcohol, carboxymethylcellulose, starch, agar, gelatin, and glue.

10. The manufacturing method according to the above 5, wherein the cellulose fibers are cellulose microfibrils.

11. The manufacturing method according to the above 10, wherein the cellulose microfibrils are cellulose microfibril fiber bodies containing nanostructures composed of at least one of cellulose crystals measuring from 10 nm to 100 nm in thickness and approximately from 100 nm to 500 nm in length and cellulose nanofibers measuring from 3 nm to 100 nm in thickness and not less than 5 µm in length. The fiber width of the microfibril fiber body is not less than 0.1 µm, and the length thereof is not less than 0.5 µm.

12. A rubber composition including from 1 to 30 parts by mass of the thermally expandable microcapsule complex described in the above 1 per 100 parts by mass of a rubber component.

13. A pneumatic tire including a vulcanized product of the rubber composition described in the above 12.

14. The pneumatic tire according to the above 13, wherein the vulcanized product of the rubber composition described in the above 12 is used in treads.

15. The pneumatic tire according to the above 14, wherein the tire is a studless tire.

Due to the fact that the thermally expandable microcapsule complex of the present technology has a structure composed of a plurality of thermally expandable microcapsules adhered on cellulose fibers and the fact that the thermally expandable microcapsule complex having that structure is blended in a rubber composition, water-absorbing action can be significantly increased and on-ice performance can be improved while wear resistance is maintained.

Furthermore, according to the manufacturing method of the present technology, the thermally expandable microcapsule complex of the present technology can be manufactured easily and at low cost.

DETAILED DESCRIPTION

Figure 1:
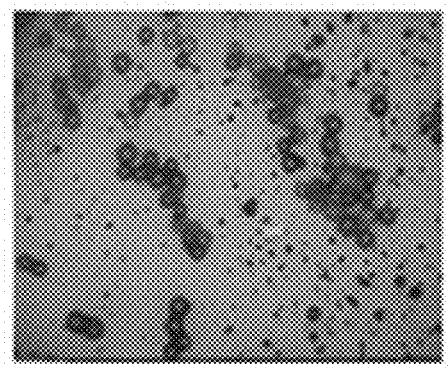
FIG. 1 is a microscope photograph of a thermally expandable microcapsule complex prepared in Example 1.

The present technology will be described in further detail below.

The thermally expandable microcapsule complex of the present technology has a structure composed of a plurality of thermally expandable microcapsules adhered on cellulose fibers, and preferably has a structure composed of a plurality of the thermally expandable microcapsules connected in a thread-like, band-like, or clustered manner on cellulose fibers.

The cellulose fibers are not particularly limited. Cellulose fibers obtained by a known method using raw materials such as wood, bamboo, hemp, jute, kenaf, regenerated pulp, recycled paper, and bacterial cellulose may be used, but cellulose microfibrils are preferred. There are known methods of preparing cellulose microfibrils. Examples include chemically treating the above raw materials with a chemical such as sodium hydroxide, and then mechanically milling or beating using a refiner, twin screw kneader (twin screw extruder), twin screw kneading extruder, high-pressure homogenizer, medium agitation mill, millstone, grinder, vibrating mill, or sand grinder.

The cellulose microfibrils are cellulose microfibril bodies containing nanostructures composed of at least one of cellulose crystals measuring from 10 nm to 100 nm in thickness and approximately from 100 nm to 500 nm in length and cellulose nanofibers measuring from 3 nm to 100 nm in thickness and not less than 5 µm in length. The fiber width of the microfibril fiber body is not less than 0.1 µm and preferably approximately from 1.0 µm to 20 µm, and the length of the fiber body is not less than 0.5 µm and preferably from 5 µm to 300 µm. The above thickness and length may be measured as respective averages by image analysis of various microscope photographs.

Commercially available cellulose fibers may be used. For example, Celish series fibers (trade name, manufactured by Daicel FineChem Ltd.) may be employed as appropriate.

The thermally expandable microcapsules have a structure in which a thermally expandable substance is encapsulated in a shell material formed from a thermoplastic resin. The shell material of the thermally expandable microcapsules can be formed from a nitrile-based polymer.

The thermally expandable substance encapsulated in the shell material of the microcapsules has the property of vaporizing or expanding due to heat. An example thereof includes at least one type selected from the group consisting of hydrocarbons such as isoalkanes and normal alkanes. Examples of the isoalkanes include isobutane, isopentane, 2-methylpentane, 2-methylhexane, and 2,2,4-trimethylpentane, and examples of normal alkanes include n-butane, n-propane, n-hexane, n-heptane, and n-octane. These hydrocarbons may each be used alone, or a plurality thereof may be used in combination. As a preferred form of a thermally expandable substance, a substance in which a hydrocarbon which is a gas at normal temperature is dissolved in a hydrocarbon which is a liquid at normal temperature may be used. By using a mixture of such hydrocarbons, it is possible to achieve sufficient expansion force from a low temperature region to a high temperature region within the vulcanization molding temperature region (150° C. to 190° C.) of an unvulcanized tire.

As such thermally expandable microcapsules, trade name "Expancel 091DU-80" or "Expancel 092DU-120" manufactured by Expancel in Sweden, trade name "Matsumoto Microsphere F-85D" or "Matsumoto Microsphere F-100D" manufactured by Matsumoto Yushi-Seiyaku Co., Ltd., and the like may be used.

The method for manufacturing the thermally expandable microcapsule complex of the present technology will now be described.

In the manufacturing method, first, an aqueous solution of a water-soluble polymer having a concentration of from 1 to 30 mass % is prepared. The water-soluble polymer acts as a binder between the cellulose fibers and the thermally expandable microcapsules, and can increase the adhesion strength therebetween.

The water-soluble polymer is not particularly limited, so long as the object of the present technology is not hindered. It is preferably at least one type selected from polyacrylic acid, polyacrylamide, polyethyleneoxide, polyvinylalcohol, carboxymethylcellulose, starch, agar, gelatin, and glue.

The concentration of the water-soluble polymer in the aqueous solution is more preferably from 1 to 10 mass %.

Then, from 5 to 60 parts by mass of cellulose fibers is added to 100 parts by mass of the above prepared aqueous solution to prepare a liquid dispersion (1). The water-soluble polymer adheres to the cellulose fibers through this step. This step may also be implemented using a known agitator. In the liquid dispersion (1), it is more preferred that from 5 to 30 parts by mass of cellulose be blended with 100 parts by mass of the above aqueous solution.

Next, from 10 to 200 parts by mass of thermally expandable microcapsules is added to the above prepared dispersion (1) to prepare a liquid dispersion (2). Through this step, a plurality of thermally expandable microcapsules adhere along the cellulose fibers, and typically, the plurality of thermally expandable microcapsules connect in a thread-like, band-like, or clustered manner. This step may also be implemented using a known agitator. In the liquid dispersion (2), it is more preferred that from 20 to 100 parts by mass of the thermally expandable microcapsules be blended with 100 parts by mass of the above aqueous solution.

Next, the moisture of the above prepared liquid dispersion (2) is evaporated. The drying method may be a known method, such as a hot wind jet dryer or the like.

In the manufacturing method of the present technology, from 1 to 10 mass % of a polar solvent is preferably blended in the thermally expandable microcapsules in the step of preparing the liquid dispersion (1) or the liquid dispersion (2). The surfaces of the thermally expandable microcapsules dissolve slightly and a plurality of capsules readily connect to each other through this operation. Examples of such polar solvents include dimethyl sulfoxide, nitrilotriethanol, propylenecarbonate, γ-butyrolactone, N-methyl-2-pyrrolidone, N,N-dimethylacetamide, dimethylformamide, acetonitrile, and dimethyl sulfoxide. One of these solvents may be used alone or a combination of two or more may be used.

Furthermore, in the manufacturing method of the present technology, a liquid dispersion (1') may be used instead of the liquid dispersion (1), wherein the liquid dispersion (1') is obtained by adding from 5 to 40 parts by mass of the aqueous solution of water-soluble polymer and from 5 to 60 parts by mass of cellulose fibers to 100 parts by mass of a non-volatile liquid compound. A non-volatile liquid compound indicates a liquid compound which is non-volatile at the heating temperature used during the subsequent moisture evaporation step. Petroleum-based non-volatile solvents are preferred, and examples thereof include adepsine oil and various waxes. Non-volatile liquid compounds such as oils, plasticizers, and oligomers may also be used. The effect of making the subsequent moisture evaporation step easy is exhibited through this operation.

According to the manufacturing method of the present technology, a complex having a structure composed of a plurality of the thermally expandable microcapsules connected in a thread-like, band-like, or clustered manner on cellulose fibers can be obtained.

The rubber composition of the present technology includes from 1 to 30 parts by mass, preferably from 1 to 15 parts by mass of the above thermally expandable microcapsule complex per 100 parts by mass of a rubber component.

Examples of the rubber component used in the rubber composition of the present technology include diene rubbers used in rubber compositions for tires. Examples of the diene rubber include natural rubber (NR), isoprene rubber (IR), butadiene rubber (BR), styrene-butadiene copolymer rubber (SBR), acrylonitrile-butadiene copolymer rubber (NBR), and ethylene-propylene-diene terpolymer (EPDM). One of these may be used alone or a combination of two or more may be used. Furthermore, the molecular weight and the microstructure thereof is not particularly limited. The terminals of the diene rubber may be modified with an amine, amide, silyl, alkoxysilyl, carboxyl, or hydroxyl group, or the like, or may be epoxidized.

Among these, combined use of NR and BR is preferable from the perspective of achieving even better on-ice performance.

The rubber composition of the present technology may include various additives generally blended in rubber compositions, such as vulcanizing or cross-linking agents; vulcanizing or cross-linking accelerators; various fillers such as carbon black, silica, clay, and calcium carbonate; anti-aging agents; and plasticizers. The additives are blended by a common method to obtain a composition that can be used for vulcanization or cross-linking. Blended amounts of these additives may be any conventional standard amount, so long as the object of the present technology is not hindered.

Furthermore, the rubber composition of the present technology may be used to produce a pneumatic tire via a vulcanization step according to a conventional method for manufacturing pneumatic tires, and may be used in treads, particularly cap treads, of studless tires.

EXAMPLES

The present technology is further described in detail with reference to the examples and comparative examples described below, but the present technology is not limited by these examples.

Method for Manufacturing Thermally Expandable Microcapsule Complex

Example 1

First, 1.2 g of polyacrylic acid was dissolved in 120 g of water, and to this was added 80 g of material containing 15% cellulose microfibrils (Celish KY110N, manufactured by Daicel FineChem Ltd.). The resultant was agitated for 5 minutes at a rotational speed of 600 rpm using an agitator equipped with a dissolver. Then, 5 g of 2,2,2-nitrilotriethanol was added, and the resultant was agitated for another 5 minutes under the same conditions. It was then transferred from the agitator equipped with a dissolver to a butterfly agitator, and 80 g of thermally expandable microcapsules (Matsumoto Microsphere F, manufactured by Matsumoto Yushi-Seiyaku Co., Ltd.) was added, and this was agitated for 2 minutes at a rotational speed of 36 rpm. The obtained liquid was subjected to jet drying using a jet dryer with a hot air temperature of 90° C. to obtain a white powder. A microscope photograph of the obtained white powder is shown in FIG. 1.

Example 2

Figure 2:
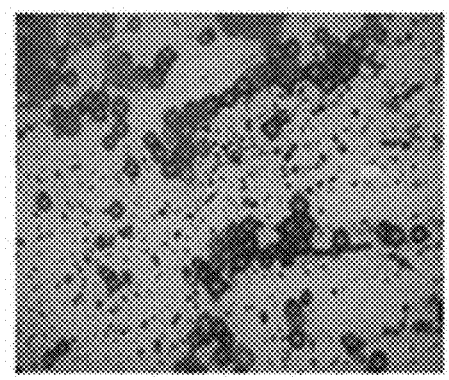
FIG. 2 is a microscope photograph of a thermally expandable microcapsule complex prepared in Example 2.

First, 1.5 g of polyvinylalcohol (poval 115) was dissolved in 100 g of water, and to this was added 120 g of material containing 10% cellulose microfibrils (Celish KY100G, manufactured by Daicel FineChem Ltd.). The resultant was agitated for 5 minutes at a rotational speed of 600 rpm using an agitator equipped with a dissolver. Then, 5 g of 2,2,2-nitrilotriethanol was added, and the resultant was agitated for another 5 minutes under the same conditions. It was then transferred from the agitator equipped with a dissolver to a butterfly agitator, and 100 g of thermally expandable microcapsules (Matsumoto Microsphere F, manufactured by Matsumoto Yushi-Seiyaku Co., Ltd.) was added, and this was agitated for 2 minutes at a rotational speed of 36 rpm. The obtained liquid was subjected to jet drying using a jet dryer with a hot air temperature of 90° C. to obtain a white powder. A microscope photograph of the obtained white powder is shown in FIG. 2.

Example 3

Figure 3:
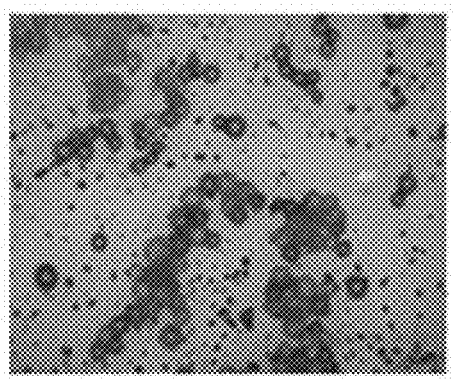
FIG. 3 is a microscope photograph of a thermally expandable microcapsule complex prepared in Example 3.

First, 1.5 g of polyacrylic acid was dissolved in 100 g of water, and to this was added 120 g of material containing 15% cellulose microfibrils (Celish KY110N, manufactured by Daicel FineChem Ltd.). The resultant was agitated for 5 minutes at a rotational speed of 600 rpm using an agitator equipped with a dissolver. Then, 5 g of dimethyl sulfoxide (DMSO) was added, and the resultant was agitated for another 5 minutes under the same conditions. It was then transferred from the agitator equipped with a dissolver to a butterfly agitator, and 90 g of thermally expandable microcapsules (Matsumoto Microsphere F, manufactured by Matsumoto Yushi-Seiyaku Co., Ltd.) was added, and this was agitated for 2 minutes at a rotational speed of 36 rpm. The obtained liquid was subjected to jet drying using a jet dryer with a hot air temperature of 90° C. to obtain a white powder. A microscope photograph of the obtained white powder is shown in FIG. 3.

Example 4

First, 10 g of 15% polyacrylic acid solution and 8 g of 2,2,2-nitrilotriethanol were added to 100 g of adepsine oil.

Figure 4:
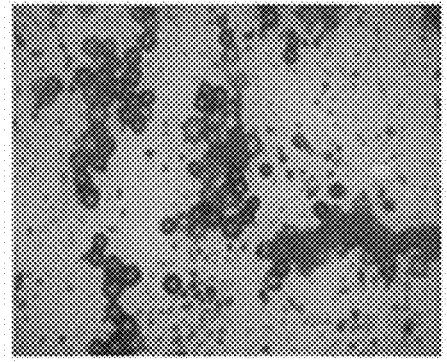
FIG. 4 is a microscope photograph of a thermally expandable microcapsule complex prepared in Example 4.

The resultant was agitated for 3 minutes at a rotational speed of 600 rpm using an agitator equipped with a dissolver. Then, 120 g of material containing 15% cellulose microfibrils (Celish KY110N, manufactured by Daicel FineChem Ltd.) was added. The resultant was agitated for 5 minutes at a rotational speed of 600 rpm using an agitator equipped with a dissolver. It was then transferred from the agitator equipped with a dissolver to a butterfly agitator, and 100 g of thermally expandable microcapsules (Matsumoto Microsphere F, manufactured by Matsumoto Yushi-Seiyaku Co., Ltd.) was added, and this was agitated for 2 minutes at a rotational speed of 36 rpm. The temperature was gradually raised to 90° C. while agitation was continued, and after agitation was continued for 90 minutes, a somewhat moist, aggregated powder-like composition was obtained. A microscope photograph of the obtained composition is shown in FIG. 4.

The results of FIGS. 1 to 4 shows that a thermally expandable microcapsule complex having a structure composed of a plurality of thermally expandable microcapsules connected in a thread-like, band-like, or clustered manner on cellulose fibers was obtained through the above manufacturing method.

Examples 5 to 9 and Comparative Examples 1 to 3

Preparation of Samples

In the blend (parts by mass) shown in Table 1, the components other than the vulcanization accelerators and sulfur were kneaded for 5 minutes in a 1.7-liter sealed Banbury mixer. The rubber was then discharged outside of the mixer and cooled at room temperature. Then, a rubber composition was obtained by adding the rubber, vulcanization accelerators, and sulfur in the same Banbury mixer and further kneading the mixture. Next, the rubber composition thus obtained was pressure vulcanized in a predetermined mold at 170° C. for 10 minutes to obtain a vulcanized rubber test sample, and then the physical properties of the vulcanized rubber test sample were measured according to the test methods shown below.

On-ice performance: Pneumatic tires having a tire size of 215/60R16 in which the various vulcanized rubber test samples were incorporated in the treads were assembled on a 16×7J rim, inflated to an air pressure of 220 [kPa], and mounted on a test vehicle (2 L sedan, front-engine, front-wheel-drive (FF) vehicle, manufactured in Japan). Then, the above test vehicle was driven on an icy test course at an initial speed of 40 [km/h] and then braked suddenly. The braking distance for the test vehicle to come to a complete stop was measured. The results were expressed as index values with the results of Comparative Example 1 being defined as 100. Larger index values indicate superior on-ice performance.

Wear resistance: Wear resistance was measured at room temperature in accordance with JIS (Japanese Industrial Standard) K6264. The results were expressed as index values with the results of Comparative Example 1 being defined as 100. Larger values indicate superior wear resistance.

The results are shown in Table 1.

TABLE 1-1

|  | Comparative Example 1 | Comparative Example 2 | Comparative Example 3 |
|---|---|---|---|
| NR *1 | 50 | 50 | 50 |
| BR *2 | 50 | 50 | 50 |
| Carbon black *3 | 35 | 35 | 35 |
| Silica *4 | 25 | 25 | 25 |
| Zinc oxide *5 | 4 | 4 | 4 |
| Stearic acid *6 | 2 | 2 | 2 |
| Anti-aging agent *7 | 2 | 2 | 2 |
| Wax *8 | 2 | 2 | 2 |
| Silane coupling agent *9 | 2 | 2 | 2 |
| Thermally expandable microcapsule *10 | — | 5 | 15 |
| Thermally expandable microcapsule complex-1 *11 | — | — | — |
| Thermally expandable microcapsule complex-2 *12 | — | — | — |
| Thermally expandable microcapsule complex-3 *13 | — | — | — |
| Thermally expandable microcapsule complex-4 *14 | — | — | — |
| Oil *15 | 20 | 20 | 20 |
| Sulfur *16 | 1.5 | 1.5 | 1.5 |
| Vulcanization accelerator *17 | 1.5 | 1.5 | 1.5 |
| Measurement result |  |  |  |
| On-ice performance | 100 | 102 | 110 |
| Wear resistance | 100 | 100 | 95 |

TABLE 1-2

|  | Example 5 | Example 6 | Example 7 | Example 8 | Example 9 |
|---|---|---|---|---|---|
| NR *1 | 50 | 50 | 50 | 50 | 50 |
| BR *2 | 50 | 50 | 50 | 50 | 50 |
| Carbon black *3 | 35 | 35 | 35 | 35 | 35 |
| Silica *4 | 25 | 25 | 25 | 25 | 25 |
| Zinc oxide *5 | 4 | 4 | 4 | 4 | 4 |
| Stearic acid *6 | 2 | 2 | 2 | 2 | 2 |
| Anti-aging agent *7 | 2 | 2 | 2 | 2 | 2 |
| Wax *8 | 2 | 2 | 2 | 2 | 2 |
| Silane coupling agent *9 | 2 | 2 | 2 | 2 | 2 |
| Thermally expandable microcapsule *10 | — | — | — | — | — |
| Thermally expandable microcapsule complex-1 *11 | 10 | 30 | — | — | — |
| Thermally expandable microcapsule complex-2 *12 | — | — | 25 | — | — |
| Thermally expandable microcapsule complex-3 *13 | — | — | — | 25 | — |
| Thermally expandable microcapsule complex-4 *14 | — | — | — | — | 25 |
| Oil *15 | 20 | 20 | 20 | 20 | 20 |
| Sulfur *16 | 1.5 | 1.5 | 1.5 | 1.5 | 1.5 |
| Vulcanization accelerator *17 | 1.5 | 1.5 | 1.5 | 1.5 | 1.5 |
| Measurement result |  |  |  |  |  |

TABLE 1-2-continued

|  | Example 5 | Example 6 | Example 7 | Example 8 | Example 9 |
|---|---|---|---|---|---|
| On-ice performance | 107 | 123 | 114 | 117 | 120 |
| Wear resistance | 100 | 95 | 100 | 100 | 98 |

*1: NR (RSS#3)
*2: BR (Nipol BR1220, manufactured by Zeon Corporation)
*3: Carbon black (N339, manufactured by Cabot Japan K.K.)
*4: Silica (Zeosil 1165MP, manufactured by Rhodia Inc.)
*5: Zinc oxide (Zinc Oxide III, manufactured by Seido Chemical Industry Co., Ltd.)
*6: Stearic acid (Beads Stearic Acid, manufactured by NOF Corporation)
*7: Anti-aging agent (Santoflex 6PPD, manufactured by Flexsys)
*8: Wax (Paraffin Wax, manufactured by Ouchi Shinko Chemical Industrial Co., Ltd.)
*9: Silane coupling agent (Si69, manufactured by Evonik Degussa Japan Co., Ltd.)
*10: Thermally expandable microcapsules (Matsumoto Microsphere F, manufactured by Matsumoto Yushi-Seiyaku Co., Ltd.)
*11: Thermally expandable microcapsule complex-1 (complex produced in the above Example 1)
*12: Thermally expandable microcapsule complex-2 (complex produced in the above Example 2)
*13: Thermally expandable microcapsule complex-3 (complex produced in the above Example 3)
*14: Thermally expandable microcapsule complex-4 (complex produced in the above Example 4)
*15: Oil (Extract No. 4S, manufactured by Showa Shell Sekiyu K.K.)
*16: Sulfur ("Golden Flower" Oil Treated Sulfur Powder, manufactured by Tsurumi Chemical Industry Co., Ltd.)
*17: Vulcanization accelerator (NOCCELER CZ-G, manufactured by Ouchi Shinko Chemical Industrial Co., Ltd.)

As revealed in Table 1, it is found that since the rubber compositions prepared in Examples 5 to 9 include the thermally expandable microcapsule complex of the present technology, they have dramatically improved on-ice performance while maintaining wear resistance compared to the typical conventional Comparative Example 1.

In contrast, Comparative Examples 2 and 3 are examples in which thermally expandable microcapsules were simply blended without the thermally expandable microcapsule complex of the present technology being blended, and as a result, it was impossible to achieve both wear resistance and on-ice performance.

The invention claimed is:

1. A rubber composition, comprising:
from 1 to 30 parts by mass of a thermally expandable microcapsule complex per 100 parts by mass of a rubber component, the thermally expandable microcapsule complex having a structure comprising a plurality of thermally expandable microcapsules adhered on cellulose fibers, wherein the thermally expandable microcapsule complex has a structure comprising a plurality of the thermally expandable microcapsules connected in a thread-like, band-like, or clustered manner on the cellulose fibers, the cellulose fibers being cellulose microfibrils.

2. A pneumatic tire comprising a vulcanized product of the rubber composition described in claim 1.

3. A pneumatic tire, wherein the vulcanized product of the rubber composition described in claim 1 is present in treads.

4. The pneumatic tire according to claim 3, wherein the tire is a studless tire.

* * * * *